United States Patent Office 3,482,020
Patented Dec. 2, 1969

3,482,020
METHOD OF CONTROLLING SOIL-BORNE NEMATODES AND FUNGI WITH 1-AZA-2-CYCLOALKENYL - 2 - CHLORO - 1 - CARBONYL OR 1-THIOCARBONYL CHLORIDES
Richard K. Brantley, Wilmington, Del., assignor to E. I. du Pont de Nemours and Company, Wilmington, Del., a corporation of Delaware
No Drawing. Filed Aug. 30, 1966, Ser. No. 575,957
Int. Cl. A01n 9/22
U.S. Cl. 424—244                        8 Claims

ABSTRACT OF THE DISCLOSURE

A method for controlling soil-borne nematodes and fungi is disclosed comprising applying to soil an effective amount of a compound of the formula

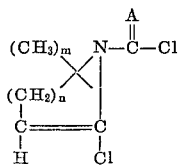

wherein:
A is oxygen or sulfur,
m is 0 or 1, and
n is 2, 3 or 4.

DESCRIPTION OF THE INVENTION

This invention relates to methods for controlling soil-borne nematodes and fungi. More particularly, this invention refers to methods for controlling soil-borne nematodes and fungi by applying to soil a pesticidal amount of a 1-aza-2-cycloalkenyl-2-chloro-1-carbonyl or 1-thiocarbonyl chloride.

Most agricultural and horticultural soils contain populations of plant-parasitic nematodes and plant-pathogenic fungi. Attack by these organisms upon plant parts or tissues can cause partial or even complete destruction of a crop. Thus, effective, economical methods of preventing such damage are needed to protect the financial interests of farmers and horticulturists. More importantly, such methods are needed to assure an adequate supply of the agricultural and horticultural commodities required by the ever-expanding world population.

The present invention is directed to methods for controlling soil-borne nematodes and fungi by applying to soil one or more 1-aza-2-cycloalkenyl-2-chloro-1-carbonyl or 1-thiocarbonyl chloride characterized by the formula:

I

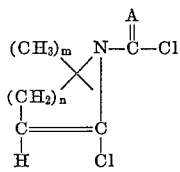

wherein:
A is oxygen or sulfur,
m is 0 or 1, and
n is 2, 3 or 4.

Because of their high order of activity against soil-borne nematodes and fungi and because they can be most easily prepared, the compounds represented by the following formula are preferred:

II

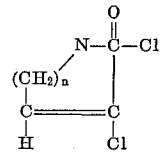

wherein n is 2, 3 or 4.

The most preferred compound is 7-chloro-2,3,4,5-tetrahydroazepine-1-carbonyl chloride.

PREPARATION

The carbonyl chlorides of Formula I are prepared according to the method disclosed in U.S. Patent 3,080,358 by reacting a lactam with at least about 2 moles of phosgene per mole of lactam. This method is represented by the following reaction where m and n have the same significance as above:

(i)

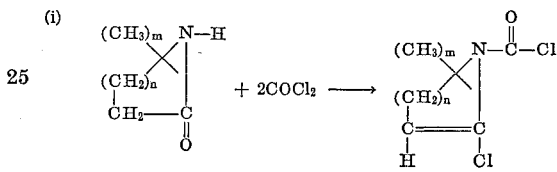

The thiocarbonyl chlorides are prepared by substituting thiophosgene for phosgene in the above reaction.

The dual utility shown by the compounds used in the methods of this invention is particularly advantageous since in the absence of such utility, two or more materials must be employed to provide protection against both nematodes and fungi present in the soil. Moreover, at useful rates these compounds are safe to growing plants and plant reproductive parts. This eliminates the need for delay between the time of treatment and the time of planting which is necessary if many other commercially available chemicals are used to control soil-borne pests. Also, these compounds can be easily and safely handled, provide an extended period of protection, can be economically produced and are effective at low rates of application.

Specific plant-parasitic nematodes that are controlled by the methods of this invention include but are not limited to the following:

Belonolaimus species—Sting nematode
Criconemoides species—Ring nematodes
Dolichodorus heterocephalus—Awl nematode
Helicotylenchus species—Spiral nematodes
Heterodera schachtii—Sugar beet nematode
Hoplolaimus species—Lance nematodes
Meloidogyne incognita—Southern root-knot nematode
Meloidogyne hapla—Northern root-knot nematode
Meloidogyne arenaria—Peanut root-knot nematode
Meloidogyne exigua—Coffee root-knot nematode
Pratylenchus brachyurus—Smooth-headed lesion nematode
Pratylenchus species—Meadow or lesion nematodes
Trichodorus species—Stubby-root nematodes
Tylenchorhynchus species—Stunt nematodes
Xiphinema species—Dagger nematodes The methods of this invention are also particularly effective in controlling soil-borne fungi belonging to the genera Phythium and Rhizoctonia. Other soil fungi such as Fusarium species, Phytophthora species, Thielaviopsis species, Pellicularis species, Verticillium species, and the like are also controlled.

COMPOSITIONS

Compositions suitable for field application will include one or more compounds of Formula I and such solid and liquid diluents, solvents, surface active agents, and other ingredients as desired to produce solutions, dusts, wettable powders, granules, emulsifiable concentrates and the like.

The surface active agents, or surfactants as they are sometimes called, act as wetting, dispersing and emulsifying agents, and can include many anionic, non-ionic and cationic agents as have heretofore been used in agricultural compositions. A detailed list of suitable surfactants is found in "Detergents and Emulsifiers Annual—1965" (John W. McCutcheon, Inc.).

Anionic and non-ionic surfactants are preferred. Prefered anionic surfactants include alkali and alkaline earth salts of alkylarylsulfonic acids such as dodecylbenzene-sulfonates and alkylnaphthylenesulfonates; dialkyl sodium sulfosuccinate esters; sodium lauryl sulfate, sodium dodecyldiphenyl ether disulfonate; and fatty acid esters of sodium isothionate. Preferred non-ionic surfactants include polymeric ethylene oxide adducts of octyl phenol, nonyl phenol, dodecyl phenol, sorbitan fatty acid esters, aliphatic alcohols, and long chain mercaptans as well as poly(ethyleneoxy) esters of fatty acids. Preferred dispersants for wettable powders are alkali and alkaline earth ligninsulfonates and salts of polymerized alkylarylsulfonic acids.

The compositions can contain, with or without surfactants, finely divided solid diluents such as talcs, attapulgites, montmorillonites, kaolinites, diatomaceous earths, synthetic silicates or aluminates and organic flours.

Liquid formulations can be simple solutions in organic liquids or, with the addition of suitable emulsifiers, can be water-emulsifiable concentrates.

In some instances it is desirable to include special purpose additives which will inhibit corrosion, reduce foaming, reduce caking or increase flocculation. For maximum shelf-life the compositions should be relatively free of moisture, reactive materials, and catalysts known to take part in reactions of carbonyl chlorides. Inclusion of desiccants in the compositions and moisture-tight packaging are both desirable.

It is also sometimes desirable to combine the compounds used in this invention with from 0.1 to 10 parts by weight of other compounds known to be effective pesticides, either in a concentrated premix or during the application step. In some instances when such combinations are employed, the results obtained are better than would be expected from a simple additive effect. The following list is illustrative of the pesticides that can be utilized in combination with the 1-aza-2-cycloalkenyl-2-chloro-1-carbonyl or 1-thiocarbonyl chlorides used in this invention:

S-methyl O-(methylcarbamyl)thiolacetohydroxamate
S-methyl p-chloro-O-(methylcarbamyl)thiolbenzohydroxamate
S-methyl O-(methylcarbamyl)thiolisobutyrohydroxamate
1,4-dichloro-2,5-dimethoxybenzene
Trichloro-bis(4'-chlorophenyl)ethane
Aldrin
Endrin
Dieldrin
Parathion
Hexachlorophene
Tetramethyl thiuram disulfide
Ethylene dibromide
Allyl alcohol
Formaldehyde
N-trichloromethylthio-4-cyclohexene-1,2-dicarboximide
p-(dimethylamino)benzenediazo sodium sulfonate
Hexachlorobenzene
1-chloro-2-nitropropane
3,5-dimethyltetrahydro-1,3,5-thiadiazine-2-thione
3-(trichloromethyl)-5-ethoxy-1,2,4-thiadiazole
Methyl bromide
Chloropicrin
Pentachloronitrobenzene
2,3-dichloro-1,4-naphthoquinone
Tetrachloro-p-benzoquinone
1,2-dibromo-3-chloropropane
1,3-dichloropropene with 1,2-dichloropane
Phenyl N,N'-dimethylphosphorodiamidate
Sodium methyldithiocarbamate Compositions will usually contain ingredients in amounts within the ranges indicated below, although some departure from these levels may be desirable for application with particular equipment or on certain crops. The special purpose additives and other pesticides suggested above can also be included. All percentages are by weight.

(1) Dusts or dust bases: Percent
  Compound of Formula I _____ 2–50
  Surfactants _____ 0–6
  Inert solid diluents _____ 44–98
(2) Wettable powders:
  Compound of Formula I _____ 10–50
  Surfactants _____ 0.5–10
  Inert solid diluents _____ 40–80
(3) Solutions and emulsifiable concentrates:
  Compound of Formula I _____ 5–90
  Surfactant _____ 0–15
  Organic solvent _____ 10–95

The higher levels of surfactants are used for the emulsifiable concentrates.

(4) Granules using performed carriers: Percent
  Compound of Formula I _____ 5–20
  Surfactant _____ 0–4
  Inert preformed granular carrier _____ 10–95

Pellets formed by extrusion and granules formed by tumbling will contain like amounts of ingredients except that a finely divided inert carrier will be used instead of the preformed granular carrier.

The above compositions are prepared by methods generally used for pesticidal compositions of similar type. The solid compositions, with the exception of granules, are prepared in a blending operation which includes passage of the ingredients through an attrition mill such as a hammer mill or fluid energy mill.

Solutions are prepared by stirring the combined ingredients, with warming in some cases to speed solution.

Granules are prepared by different procedures. Preformed, absorptive granules are sprayed with a solution of active ingredient and adjuvants, or with a mixture of active ingredient and adjuvants which is warmed as needed to produce a free-flowing liquid. Alternatively, the active ingredient and solid diluents are mixed with sufficient liquid to permit the extrusion of pellets or formation of granules by tumbling.

Compositions containing other pesticides can consist of simple combinations of compositions of similar type, although modifications may be required to obtain good properties. They can also be prepared by substituting the additional pesticide for a portion of a compound of Formula I in the general descriptions above.

APPLICATION

In practicing the methods of this invention, one or more compounds of Formula I is applied to soil in an amount sufficient to exert the desired pesticidal action. The amounts sufficient to exert the desired action upon soil-borne nematodes in particular and soil-borne fungi in particular are referred to herein as the "nematocidal amount" and the "fungicidal amount" respectively. The expression "applying to soil" as used herein is intended to include both direct application to soil and application to plant reproductive parts which are subsequently placed in soil. "Plant reproductive parts" include seed, tubers, bulbs, cane pieces and the like. The term "controlling" as used herein is intended to include killing, inactivating or otherwise preventing the destructive effects of soil-borne, plant-parasitic nematodes and/or soil-borne, plant-pathogenic fungi.

It will be appreciated that the pesticidal amount will vary with the particular nematodes and/or fungi involved, the particular active ingredient, type of composition and application method utilized, the plant species to be protected and prevailing conditions such as temperature, moisture content of the soil, nature of the soil and the like. Since many factors are involved, it is not possible to indicate generally one rate of application suitable for all situations. However, effective resolution of these factors in determining the pesticidal amount in a given situation is well within the ability of persons of ordinary skill in the art. Generally suitable ranges of application rates for particular application methods are set forth below.

The compounds used in this invention can be applied prior to, during or subsequent to planting by incorporation or injection into the soil. After plants are established, soil-incorporation or injection methods are generally not suitable since excessive damage to root systems is likely to occur. The area treated can range from a band a few inches wide over the row up to complete coverage of the crop area. Application rates for soil-incorporation or injection methods are from about 10 to about 100 pounds of active compound per acre of crop area actually treated. Preferred rates for this type of application are from about 30 to about 80 pounds per acre. The most preferred rates are from about 40 to about 60 pounds per acre.

Other application methods include in-the-furrow treatment prior to or during seeding or planting; treatment of plant reproductive parts prior to seeding or planting; addition to water used in transplanting; and soil surface sprays. In-the-furrow application rates are from about 0.5 to about 4.0 pounds, preferably from about 2.0 to 3.0 pounds, of active ingredient per 12,000 linear feet of row. Reproductive parts are treated at rates of from about 0.1 to about 5.0 pounds, preferably from about 0.5 to 1.0 pound, of active ingredient per 100 pounds of reproductive parts. Use rates in water utilized for transplanting are from about 0.25 to about 3.0 pounds, preferably from about 0.5 to about 1.5 pounds, of active ingredient per 100 gallons of water. Soil surface spray application rates are from about 1.0 to about 15 pounds, preferably from about 2.0 to about 7.0 pounds, per acre of surface treated.

In order that the methods of this invention can be more easily understood, the following additional examples are provided. It is understood that all percentages are by weight.

EXAMPLE 1

Wettable powder: Percent
  2-chloro-2-pyrroline-1-carbonyl chloride _____ 40
  Sodium dioctylsulfosuccinate _____ 2
  Sodium lignin sulfonate _____ 3
  Diatomaceous earth _____ 25
  Synthetic fine silica _____ 10
  Calcined montmorillonite _____ 20

The ingredients are combined, thoroughly blended and then hammer-milled to produce particles substantially all below 40 microns, followed by reblending to assure homogeneity.

The wettable powder so prepared is dispersed in water at the rate of 50 pounds of formulation per 100 gallons of water. The resulting suspension is sprayed at the rate of 250 gallons per acre, i.e., 125 pounds of formulation or 50 pounds of the active ingredient, on test plots within a field in New York known to contain high levels of the fungus Rhizoctonia solani and the northern root-knot nematode (Meloidogyne hapla). Promptly following the above distribution onto the surface, the treating mixture is thoroughly mixed into the soil to a depth of four to six inches with a rotovator.

Head lettuce plants set into the treated soil grow well to produce a good yield of high-quality heads. Lettuce planted outside of the treated plots, in similar but untreated soil, grows slowly because of damage to root systems by the northern root-knot nematode and has a high incidence of rot in the outer and lower leaves at or near the soil caused by the fungus Rhizoctonia solani.

EXAMPLES 2-5

The following compounds are substituted individually for the 2-chloro-2-pyrroline-1-carbonyl chloride in Example 1 in like amount by weight. They are each formulated and applied in like manner with like results being obtained:

(2) 7-chloro-2,3,4,5-tetrahydroazepine-1-carbonyl chloride
(3) 6-chloro-3,4-dihydro-1(2H)-pyridinethiocarbonyl chloride
(4) 7-chloro-2,3,4,5-tetrahydro-4-methylazepine-1-carbonyl chloride
(5) 7-chloro-2,3,4,5-tetrahydroazepine-1-thiocarbonyl chloride

EXAMPLE 6

Wettable powder: Percent
  7-chloro-2,3,4,5-tetrahydroazepine-
    1-thiocarbonyl chloride _____ 20
  Sodium alkylnaphthalensulfonate _____ 3
  Crude calcium and magnesium ligninsulfonate __ 5
  Diatomaceous earth _____ 20
  Anhydrous magnesium sulfate _____ 2
  Kaolinite _____ 50

The ingredients are combined, thoroughly blended and air-milled to yield particles essentially all below 20 microns.

The wettable powder so prepared is dispersed in water at a rate of 30 pounds of formulation per 100 gallons of water. The resulting suspension is sprayed onto the surface of soil in test plots within a field in Florida known to contain plant-parasitic nematodes and plant-pathogenic fungi. Included are high populations of nematodes such as the southern root-knot nematode (Meloidogyne incognita), sting nematodes (Belonolaimus species), and stubby-root nematodes (Trichodorus species). Among the fungi present are Pythium species and Rhizoctonia species. The volume of spray applied to the test plots is such as to result in a uniform deposition of 60 pounds of active ingredient per surface acre. The treating mixture is promptly mixed with the soil to a depth of four inches with a disk and the entire field is then planted with bush beans.

In the treated plots, a complete stand of vigorous plants and a good yield of high-quality beans are obtained. In adjacent areas in the same field not receiving the treatment, few plants survive the ravages of the fungi. Those plants which do survive in the untreated areas grow poorly because of nematode attack on the roots. The marketable yield from the untreated areas is very low.

EXAMPLE 7

Dust: Percent
  7-chloro-2,3,4,5-tetrahydroazepine-
    1-carbonyl chloride _____ 40
  Synthetic fine silica _____ 20
  Diatomaceous earth _____ 40

The active ingredient is warmed and then slowly sprayed upon the diluent with continuous agitation in a twin-shell blender. To insure homogeneity the product is passed through a hammer mill with a coarse screen and reblended prior to packaging. Near the site of use, one part of this dust concentrate is blended with three parts of talc to produce a 10% dust suitable for hopper-box or direct application.

The 10% dust so prepared is added to one hopper-box of a two-row cotton planter along with machine-delinted cotton seed at the rate of 10 pounds of dust, i.e., one pound of active ingredient, per 100 pounds of seed. Good mixing of the dust and the seed is assured by adding alternate thin layers of dust and seed. The other hopper-box on the cotton planter is filled with the same lot of cotton seed but no dust is added. The planter is then used to plant test rows across a field in North Carolina.

After eight weeks the rows planted from the hopper-box to which the dust is added contain complete stands of well-developed and vigorously-growing cotton plants. The rows planted from the hopper-box not receiving the dust have only scattered cotton plants because of attacks on seeds and young plants by soil-borne fungi of the genera Pythium, Rhizoctonia and Fusarium. The few plants that survive in the untreated rows are stunted as a result of damage to the roots by nematodes such as meadow or lesion nematodes (Pratylenchus species) and the southern root-knot nematode (*Meloidogyne incognita*).

EXAMPLE 8

| Dust: | Percent |
|---|---|
| 2-chloro-2-pyrroline-1-thiocarbonyl chloride | 5 |
| Synthetic aluminosilicate | 5 |
| Fine kaolinite | 20 |
| Sodium alkylnaphthalensulfonate | 2 |
| Pyrophyllite | 68 |

With efficient mixing, the active ingredient is sprayed upon the blending mixture of alumino silicate and fine kaolinite. After the active ingredient is added, the sodium alkylnaphthalenesulfonate and pyrophyllite are added and the entire mixture is blended. The product is then passed through a hammer mill and reblended prior to packaging.

The 5% dust so prepared is dusted into alternate open furrows with seed pieces in place in a sugar cane field in Florida. The dust is applied at a rate which provides three pounds of the active ingredient per 12,000 linear feet of furrow. The dust stream is directed in such a way that the sides and the bottom of the furrow are covered. The furrows are then closed.

Ten weeks after this planting the treated rows contain full stands of well-developed cane of good dark-green color. The untreated rows have only sparce stands of stunted cane having an unthrifty yellow appearance because of root rot caused by fungi of the genus Pythium and root damage caused by such nematodes as lance nematodes (Hoplolaimus species), spiral nematodes (Helicotylenchus species) and stunt nematodes (Tylenchorhynchus species).

EXAMPLE 9

| Oil formulation: | Percent |
|---|---|
| 6-chloro-3,4-dihydro-1(2H)-pyridine-carbonyl chloride | 10 |
| Amylene dichloride | 10 |
| Hydrocarbon oil | 80 |

The active ingredient and the emylene dichloride are combined with stirring and the resulting solution is extended with the hydrocarbon oil.

The solution so prepared is injected into a Virginia field using paired shanks spaced in such a way that one shank runs three inches on each side of the projected rows. The shanks are set at a depth of six inches and the solution is applied at a rate which provides 7.5 pounds of the active ingredient from each shank per 12,000 feet of row, i.e., 15 pounds per 12,000 feet of crop row. One-half of the field is so treated. Two weeks after treatment, tobacco plants are set in the treated rows as well as in the remainder of the field.

Eight weeks after planting, the tobacco plants in the treated rows are well-developed and growing vigorously. In the untreated rows the tobacco plants are small and growing slowly because of combined nematode and fungus attack on the root systems.

EXAMPLE 10

| Concentrated oil formulation: | Percent |
|---|---|
| 7-chloro-2,3,4,5-tetrahydro-4-methylazepine-1-carbonyl chloride | 65 |
| Kerosene | 35 |

The ingredients are combined with stirring.

The concentrated formulation so prepared is applied in the manner described in Example 9 with the exception that a lesser volume is used to provide the 7.5 pounds of active ingredient from each shank per 12,000 feet of row. The results of the treatment are the same as described in Example 9.

EXAMPLE 11

| Emulsifiable concentrate: | Percent |
|---|---|
| 7-chloro-2,3,4,5-tetrahydro-5-methylazepine-1-carbonyl chloride | 80 |
| Kerosene | 13 |
| Blend of alkylarylsulfonates and polyoxyethylene derivatives | 7 |

The ingredients are combined and blended, taking care to exclude water and other reactive species from the medium.

The emulsifiable concentrate so prepared is added to water in an amount which provides 1.5 pounds of active ingredients per 100 gallons of water. The resulting diluted emulsion is used as transplant water in the field setting of tomato plants in New Jersey. One pint is poured about the roots of each tomato plant as the soil is pushed into place. Only alternate rows are treated with the dilute emulsion. For the remaining rows, only plain water is used.

Six weeks after planting, the plants that receive the emulsion are all established and growing well. The untreated plants, on the other hand, are dead in some cases and otherwise, are small and are of poor vigor because of attack by fungi of the genus Rhizoctonia and the southern root-knot nematode (*Meloidogyne incognita*).

EXAMPLE 12

| Emulsifiable concentrate: | Percent |
|---|---|
| 7-chloro-2,3,4,5-tetrahydro-3-methylazepine-1-carbonyl chloride | 40 |
| Xylene | 25 |
| Aromatic naphthas | 31 |
| Blend of alkylarylsulfonates and polyoxyethylene derivatives | 4 |

The ingredients are combined and blended, taking care to exclude moisture.

The emulsifiable concentrate so prepared is added to water at a rate which provides six pounds of the active ingredient per 100 gallons water. The dilute aqueous emulsion is sprayed on an 18-inch band on either side of the row at the rate of 100 gallons per acre of surface treated in plots within a field of young cucumber plants prior to the formation of runners.

Within the plots treated in this manner, a high yield of good quality cucumbers is obtained. Outside the treated plots, a high percentage of the fruit shows rotted spots in the area of contact with the soil because of attack by fungi of the genus Pythium.

EXAMPLE 13

| Granules: | Percent |
|---|---|
| 7-chloro-2,3,4,5-tetrahydroazepine-1-carbonyl chloride | 12.5 |
| 20–40 mesh dried attapulgite granules | 87.5 |

The active ingredient is warmed and sprayed upon the inert carrier in a twin-shell blender.

The granular product so prepared is applied to soil infested with the northern root-knot nematode (*Meloidogyne hapla*) and a virulent strain of the root rot fungus *Rhizoctonia solani*. Application is made at the rate of 50 pounds of active ingredient per acre using a conventional fertilizer spreader. The granules are worked into the soil to a depth of 4 to 6 inches by disking.

Beans planted in the treated soil emerge to a good stand, grow well and produce a normal crop. Beans planted at the same time in untreated portions of the same field, develop only a partial stand, grow slowly and provide only a partial yield due to attack by the northern root-knot nematode and the root rot fungus.

What is claimed is:

1. A method for controlling soil-borne nematodes comprising applying to said nematodes a nematocidal amount of a compound of the formula:

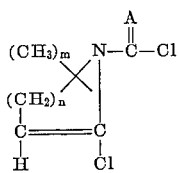

wherein:

A is oxygen or sulfur,
$m$ is 0 or 1, and
$n$ is 2, 3 or 4.

2. A method according to claim 1 wherein the compound applied is 7-chloro-2,3,4,5-tetrahydroazepine-1-carbonyl chloride.

3. A method according to claim 1 wherein the compound applied is 6-chloro-3,4-dihydro-1(2H)-pyridinecarbonyl chloride.

4. A method according to claim 1 wherein the compound applied is 2-chloro-2-pyrroline-1-carbonyl chloride.

5. A method for controlling soil-borne fungi comprising applying to said fungi a fungicidal amount of a compound of the formula:

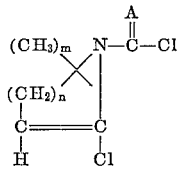

wherein:

A is oxygen or sulfur,
$m$ is 0 or 1, and
$n$ is 2, 3 or 4.

6. A method according to claim 5 wherein the compound applied is 7-chloro-2,3,4,5-tetrahydroazepine-1-carbonyl chloride.

7. A method according to claim 5 wherein the compound applied is 6-chloro-3,4-dihydro-1(2H)-pyridinecarbonyl chloride.

8. A method according to claim 5 wherein the compound applied is 2-chloro-2-pyrroline-1-carbonyl chloride.

References Cited

UNITED STATES PATENTS 3,080,358  3/1963  Ottenheym et al. ___ 260—239.3

FOREIGN PATENTS 901,170  7/1962  Great Britain.

OTHER REFERENCES

Chemical Abstracts, (I) vol. 52, 11116(b), 1958, (II) vol. 57, 16578(i), 1962.

ALBERT T. MEYERS, Primary Examiner

H. M. ELLIS, Assistant Examiner

U.S. Cl. X.R.

424—263, 274